US009036498B2

(12) United States Patent
Perets

(10) Patent No.: US 9,036,498 B2
(45) Date of Patent: May 19, 2015

(54) MITIGATION OF FALSE PDCCH DETECTION

(71) Applicant: Marvell International, Ltd., Hamilton (BM)

(72) Inventor: Yona Perets, Ra'anana (IL)

(73) Assignee: MARVELL INTERNATIONAL LTD., Hamilton (BM)

( * ) Notice: Subject to any disclaimer, the term of this patent is extended or adjusted under 35 U.S.C. 154(b) by 102 days.

(21) Appl. No.: 13/776,741

(22) Filed: Feb. 26, 2013

(65) Prior Publication Data

US 2013/0223252 A1 Aug. 29, 2013

Related U.S. Application Data

(60) Provisional application No. 61/604,268, filed on Feb. 28, 2012.

(51) Int. Cl.
*H04L 29/02* (2006.01)
*H04L 1/00* (2006.01)
*H04L 1/20* (2006.01)
*H04L 25/00* (2006.01)
*H04L 5/00* (2006.01)

(52) U.S. Cl.
CPC .............. *H04L 1/0045* (2013.01); *H04L 1/208* (2013.01); *H04L 1/00* (2013.01); *H04L 25/00* (2013.01); *H04L 1/0059* (2013.01); *H04L 1/0061* (2013.01); *H04L 1/201* (2013.01); *H04L 5/0091* (2013.01)

(58) Field of Classification Search
CPC ........... H04W 72/0406; H04W 72/042; H04L 1/0045; H04L 1/208
USPC .......................................................... 370/329
See application file for complete search history.

(56) References Cited

U.S. PATENT DOCUMENTS

| | | | |
|---|---|---|---|
| 2011/0083065 A1* | 4/2011 | Singh et al. .................... | 714/807 |
| 2011/0110315 A1* | 5/2011 | Chen et al. ..................... | 370/329 |
| 2013/0155872 A1* | 6/2013 | Subramanian et al. ........ | 370/242 |
| 2013/0205176 A1* | 8/2013 | Qian et al. ..................... | 714/704 |

OTHER PUBLICATIONS

3GPP TS 36.213, "Technical Specification Group Radio Access Network; Evolved Universal Terrestrial Radio Access (E-UTRA); Physical layer procedures", Release 9, Version 9.3.0, 80 pages, Sep. 2010.
Motorola, "PDCCH False Detection", 3GPP TSG RAN1 #57bis, 5 pages, Los Angeles, USA, Jun. 29-Jul. 3, 2009.

(Continued)

*Primary Examiner* — Min Jung

(57) ABSTRACT

A method includes receiving in a communication terminal a signal, which is transmitted in multiple links and which includes a control channel transmitted in an assigned sequence of the links. One or more candidate sequences of the links, which are likely to be the assigned sequence, are identified. For at least, one candidate sequence, a verification is made whether the candidate sequence is the assigned sequence, by re-encoding decoded bits of the candidate sequence to produce regenerated symbols and comparing the regenerated symbols to respective received symbols from which the decoded bits were decoded. The control channel is decoded from the candidate sequence in response to verifying that the candidate sequence is the assigned sequence.

17 Claims, 2 Drawing Sheets

(56) References Cited

OTHER PUBLICATIONS

Motorola, "Resource element energy settings for data, control, and RS", 3GPP TSG RAN1 #50, 2 pages, Orlando, USA, Oct. 8-12, 2007.

Yamamoto et al., "Viterbi Decoding Algorithm for Convolutional codes with Repeat Request", IEEE Transactions on Information Theory, vol. IT-26, No. 5, pp. 540-547, Sep. 1980.

* cited by examiner

MITIGATION OF FALSE PDCCH DETECTION

CROSS-REFERENCE TO RELATED APPLICATIONS

This application claims the benefit of U.S. Provisional Patent Application 61/604,268, filed Feb. 28, 2012, whose disclosure is incorporated herein by reference.

FIELD OF THE DISCLOSURE

The present disclosure relates generally to wireless communication, and particularly to methods and systems for decoding of control channels.

BACKGROUND

In various wireless communication systems, base stations send control information to mobile communication terminals over downlink control channels. For example, Evolved Universal Terrestrial Radio Access (E-UTRA) systems, also referred to as Long Term Evolution (LTE), as well as LTE-Advanced (LTE-A) systems, use a downlink control channel referred to as a Physical Downlink Control Channel (PDCCH). Procedures for PDCCH processing are specified, for example, in 3GPP Technical Specification 36.213, entitled "Technical Specification Group Radio Access Network; Evolved Universal Terrestrial Radio Access (E-UTRA); Physical Layer Procedures (Release 9)," (3GPP TS 36.213), version 9.3.0, September, 2010, which is incorporated herein by reference.

Several techniques are known in the art for mitigating false PDCCH detection. Examples of such techniques are described in "PDCCH False Detection," Document R1-092642, 3GPP Technical Specification Group Radio Access Network 1 (TSG RAN1), Los Angeles, Calif., Jun. 29-Jul. 3, 2009, which is incorporated herein by reference.

The description above is presented as a general overview of related art in this field and should not be construed as an admission that any of the information it contains constitutes prior art against the present patent application.

SUMMARY

An embodiment that is described herein provides a method including receiving in a communication terminal a signal, which is transmitted in multiple links and which includes a control channel transmitted in an assigned sequence of the links. One or more candidate sequences of the links, which are likely to be the assigned sequences, are identified. For at least one candidate sequence, a verification is made whether the candidate sequence is the assigned sequence, by re-encoding decoded bits of the candidate sequence to produce regenerated symbols and comparing the regenerated symbols to respective received symbols from which the decoded bits were decoded. The control channel is decoded from the candidate sequence in response to verifying that the candidate sequence is the assigned sequence.

In some embodiments, identifying the candidate sequences includes testing a predefined set of sequences for a valid Cyclic Redundancy Check (CRC), and verifying whether the candidate sequence is the assigned sequence includes verifying whether the CRC of the candidate sequence was falsely found to be valid.

In some embodiments, comparing the regenerated symbols to the received symbols includes evaluating a distance metric between the regenerated symbols and the received symbols, and deciding that the candidate sequence is the assigned sequence when the distance metric is below a distance threshold. In an embodiment, the method includes setting the distance threshold based on a power level of the received symbols of the candidate sequence.

In another embodiment, the method includes estimating an effective Signal-to-Noise Ratio (SNR) in the links of the candidate sequence, and setting the distance threshold based on the effective SNR. In an embodiment, estimating the effective SNR includes applying an Exponential Effective Signal-to-interference Ratio Mapping (EESM) computation to known reference signals that are included in the received signal. In yet another embodiment, the method includes setting the distance threshold based on a code rate used in the control channel.

In a disclosed embodiment, identifying the candidate sequences includes selecting one or more sequences of the links for which a likelihood of being the assigned sequence is higher than a likelihood threshold. In an example embodiment, receiving the signal includes receiving a carrier-aggregation signal that includes two or more carriers, and identifying the candidate sequences includes decoding the candidate sequences from at least two of the carriers. In some embodiments, the links include time-frequency Resource Elements (REs).

There is additionally provided, in accordance with an embodiment that is described herein, an apparatus including a receiver and processing circuitry. The receiver is configured to receive a signal, which is transmitted in multiple links and which includes a control channel transmitted in an assigned sequence of the links. The processing circuitry is configured to identify one or more candidate sequences of the links that are likely to be the assigned sequence, to verify, for at least, one candidate sequence, whether the candidate sequence is the assigned sequence, by re-encoding decoded bits of the candidate sequence to produce regenerated symbols and comparing the regenerated symbols to respective received symbols from which the decoded bits were decoded, and to decode the control channel from the candidate sequence in response to verifying that the candidate sequence is the assigned sequence.

In some embodiments, a mobile communication terminal includes the disclosed apparatus. In some embodiments, a chipset for processing signals in a mobile communication terminal includes the disclosed apparatus.

There is also provided, in accordance with an embodiment that is described herein, a method including receiving in a mobile communication terminal a signal, which is transmitted in multiple links and which includes a control channel transmitted in an assigned sequence of the links. For a selected sequence of the links, decoded bits of the selected sequence are re-encoded to produce regenerated symbols. The regenerated symbols are compared to respective received symbols from which the decoded bits were decoded, and a distance metric is applied to determine a distance between the regenerated symbols and the respective received symbols. A verification is made that the selected sequence of REs contains the control channel based on the distance.

The present disclosure will be more fully understood from the following detailed description of the embodiments thereof, taken together with the drawings in which:

DETAILED DESCRIPTION OF EMBODIMENTS

Figure 1:
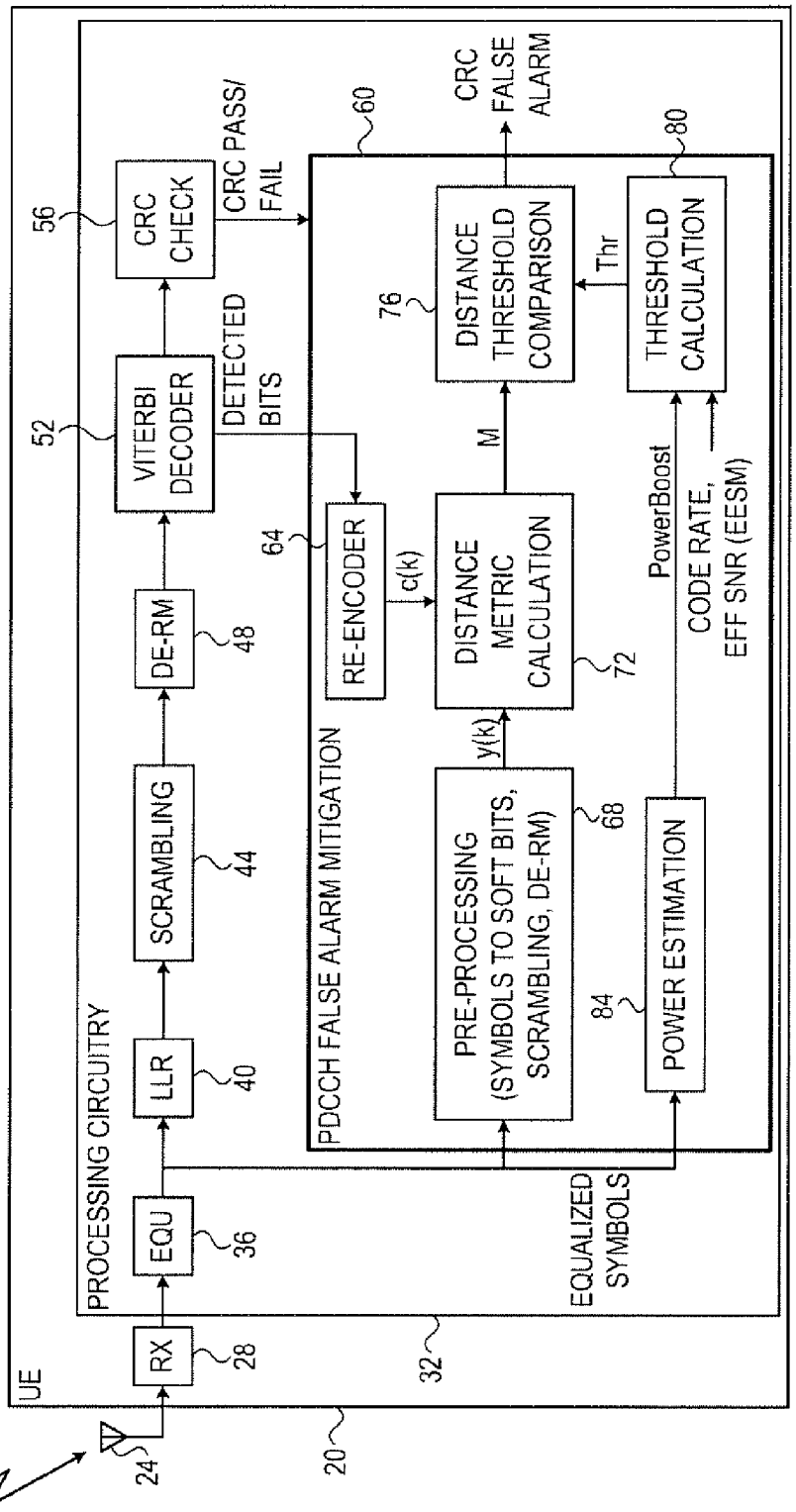
FIG. 1 is a block diagram that schematically illustrates a mobile communication terminal, in accordance with an embodiment that is described herein.

In some communication protocols, such as LTE and LTE-A, a base station transmits downlink signals to mobile communication terminals in multiple time-frequency Resource Elements (REs). Among the various downlink channels, the base station transmits control channels to mobile communication terminals in respective assigned sequences of REs. Each control channel is typically transmitted with a Cyclic Redundancy Check (CRC) code. A given terminal typically receives the downlink signal, identifies the RE sequence containing the control channel by verifying the CRC, and decodes the control channel from the identified RE sequence.

In practice, however, the CRC code is short and therefore has a non-negligible false alarm probability. As a result, the terminal has a non-negligible probability of falsely decoding the control channel, potentially causing performance degradation in the terminal and the network. For example, the terminal may decode a false uplink resource allocation ("uplink grant") and thus transmit uplink data at the wrong time and frequency and cause unnecessary interference.

Embodiments that are described herein provide improved methods and systems for mitigating false control channel detections. The embodiments described herein refer mainly to LTE and LTE-A systems. As such, the description that follows uses the LTE/LTE-A terminology, in which the base station is referred to as an eNodeB, the terminal is referred to as a User Equipment (UE), and the control channel is referred to as a Physical Downlink Control Channel (PDCCH). The disclosed techniques, however, are not limited to LTE and LTE-A, and can be used with various other communication protocols.

For example, although the embodiments described herein refer mainly to time-frequency REs and sequences of REs, the disclosed techniques are applicable to various other types of links and sequences of links that can be used for control channel, transmission.

In some embodiments, the UE receives the downlink signal from the eNodeB, finds the RE sequence containing the PDCCH and decodes the PDCCH from this RE sequence. Typically, the UE finds the RE sequence containing the PDCCH by scanning a set of possible RE sequences, attempting to find an RE sequence whose CRC is valid. In order to avoid false CRC validation, and thus false PDCCH detection, the UE carries out a false alarm mitigation process that is described in detail herein.

In some embodiments, upon identifying an RE sequence having a valid CRC, the UE re-encodes the decoded bits of the RE sequence so as to produce regenerated symbols. The UE then compares the regenerated symbols to the received symbols of the RE sequence, i.e., to the received symbols that were decoded to obtain the decoded bits. Based on the comparison, the UE decides whether the RE sequence is indeed the assigned sequence that carries the PDCCH, or whether it is a false alarm.

The UE typically decodes the PDCCH from the RE sequence only if the sequence is verified using the above technique, i.e., only if the regenerated symbols are sufficiently similar to the received symbols. In an example embodiment, the UE calculates a distance metric between the regenerated symbols and the received symbols, for example a Root-Mean-Square (RMS) distance, and decodes the PDCCH from the RE sequence only if the distance metric is below a distance threshold. Several example criteria for setting and adapting the distance threshold are described herein.

The disclosed techniques reduce the probability of false PDCCH detection considerably, and therefore prevent the associated performance degradation in the UE and the network. At the same time, the disclosed techniques do not increase the probability of misdetection. The methods and systems described herein can be applied, for example, in a post-processing manner, i.e., after receiving and storing the relevant RE sequences in memory. The false detection mitigation process requires little or no additional memory in the UE, in an embodiment.

FIG. 1 is a block diagram that schematically illustrates a UE 20, in accordance with an embodiment that is described herein. In the embodiments described herein, UE 20 operates in accordance with the LTE or LTE-A specifications. In alternative embodiments, however, UE 20 may operate in accordance with any other suitable communication protocol.

UE 20 receives downlink signals from a base station. In the present example the base station comprises an LTE or LTE-A eNodeB, and downlink signal comprises an Orthogonal Frequency Division Multiplex (OFDM) signal that is transmitted in multiple time-frequency Resource Elements (REs). The downlink signal comprises various channels, including at least one PDCCH.

In accordance with the LTE and LTE-A specifications, the PDCCH is transmitted in an assigned sequence of REs, which is selected from a set of possible sequences. (The REs used for PDCCH transmission are arranged in the time-frequency domain in blocks of 36 REs referred to as Control Channel Elements—CCEs—and the sequences in question are actually defined as sequences of CCEs). Within the REs of the sequence, the control information of the PDCCH is modulated using Quaternary Phase Shift Keying (QPSK) and encoded with a convolutional Error Correction Code (ECC).

Each possible RE sequence is associated with respective parameters, such as the number of CCEs in the sequence (referred to as "aggregation level"), and the ECC code rate used for encoding the control information in the sequence. Each PDCCH is transmitted with a 16-bit Cyclic Redundancy Check (CRC) code.

In the embodiment of FIG. 1, UE 20 comprises at least one antenna 24 and a receiver (RX) 28 for receiving the down Link signal, and processing circuitry 32 for processing the received signal. Receiver 28 receives the downlink signal via antenna 24, down-converts the signal to baseband and performs additional functions such as low-noise amplification, filtering, gain control and digitization. The digitized baseband signal is provided to processing circuitry 32.

In the processing circuitry, the received signal is filtered by an equalizer 36, so as to produce e stream of equalized symbols. A fog Likelihood Ratio (LLR) calculation module 40 calculates LLRs for the respective bits of the equalized symbols. A scrambling module 44 scrambles the LLRs in accordance with some scrambling sequence. A De-Rate-Matching (DE-RM) module 48 reverses the rate matching applied in the PDCCH. A Viterbi decoder 52 decodes the convolutional ECC. The decoded bits are provided to a CRC checking module 56, which verifies whether the CRC associated with the sequence is valid or not. For a given RE sequence, module 56 produces a CRC pass/fail, indication.

In a typical PDCCH decoding process, processing circuitry 32 searches over a set of RE sequences that are predefined for PDCCH transmission. Each RE sequence, together with the associated parameters described above, is referred to as a hypothesis. Processing circuitry 32 typically tests the various hypotheses, attempting to identify an RE sequence having a valid CRC. Upon finding a valid CRC, the processing circuitry decodes the PDCCH from the respective RE sequence.

In some embodiments, processing circuitry 32 comprises a PDCCH false alarm mitigation unit 60 that identifies false PDCCH detection. Unit 60 typically operates on an RE sequence that was decided by CRC checking module 56 to have a valid CRC. Unit 60 outputs an indication as to whether the decision of module 56 is correct or whether the valid CRC detection is a false alarm. In the present context the terms "false alarms" or "false detection" refer to an event in winch CRC checking module 56 decides that the CRC or an RE sequence is valid, even though the RE sequence does not contain a PDCCH. False PDCCH detection may occur, for example, because of noise or interference. The probability of false PDCCH detection is non-negligible, for example, when the CRC is short (e.g., sixteen bits in LTE and LTE-A) and/or when the number of tested hypotheses is large (e.g., forty-four hypotheses in LTE and up to sixty hypotheses in LTE-A).

In the present, example, PDCCH false alarm mitigation unit 60 comprises a re-encoder 64, which re-encodes the decoded bits produced by Viterbi decoder 52 so as to produce regenerated symbols. The regenerated symbols are denoted c(k) in the figure, in an embodiment, the PDCCH is modulated using QPSK, and the regenerated symbols comprise soft bits, i.e., the scalar values of the individual In-phase and Quadrature (I/Q) components of the QPSK symbols, each component corresponding to a single decoded bit.

In an embodiment, unit 60 comprises a pre-processing unit 68, which pre-processes the received symbols produced by equalizer 36 in order to make them comparable to the corresponding regenerated symbols c(k). In the present example, pre-processing unit 68 converts the received QPSK symbols into soft bits, and applies scrambling and DE-RM similarly to scrambler 44 and DE-RM module 48. The stream of pre-processed symbols produced by module 68 is denoted y(k). Module 48 is configured such that y(k) is aligned with (k), i.e., each received symbol is aligned for comparison with the respective regenerated symbol.

In an embodiment, unit 60 further comprises a distance metric calculation module 72 that compares the received symbols y(k) with the respective regenerated symbols c(k). Module 72 typically calculates a distance metric between y(k) and c(k), so as to produce a distance denoted M. A small value of M indicates that the regenerated symbols are similar to the received symbols, and are therefore likely to be a genuine PDCCH. A large value of M indicates that the regenerated symbols differ from the received symbols, and are therefore unlikely to be a PDCCH.

In an example embodiment, the distance metric calculated by module 72 comprises a Root-Mean-Square (RMS) distance between y(k) and c(k), which is given by:

$$M = \sqrt{\frac{1}{\text{length}(A)} \sum_{k \in A} (y(k)/\hat{\alpha} - c(k))^2} \quad \text{Equation 1}$$

wherein y(k) denotes the normalized received soft bits, c(k) denotes the regenerated soft bits (in the present example ±1 values), A denotes the group of indices of the non-zero soft bits, and $\hat{\alpha}$ denotes a gain-boost term that is given by:

$$\hat{\alpha} = \frac{1}{\text{length}(A)} \sum_{k \in A} y(k) \cdot c(k) \quad \text{Equation 2}$$

In alternative embodiments, however, module 72 may calculate any other suitable distance metric between the received symbols and the regenerated symbols.

A distance threshold comparison module 76 compares the distance M to a distance threshold denoted Thr. If M is below Thr, module 76 outputs an indication that the valid CRC detection of module 56 is correct, i.e., that the RE sequence indeed contains a PDCCH. If M is above Thr, module 76 outputs an indication that the valid CRC detection of module 56 is incorrect, i.e., a false alarm. Processing circuitry 32 typically decides whether or not to decode the PDCCH based on the indication of module 76.

In some embodiments, unit 60 sets or adapts the value of the distance threshold Thr depending on certain properties of one received signal. In the embodiment of FIG. 1, unit 60 comprises a threshold calculation module 80 that calculates Thr based on the instantaneous effective Signal to Noise Ratio (SNR) estimated for the PDCCH, and the ECC code rate used in the hypothesis corresponding to the RE sequence. The mapping between effective SNR, code rate and threshold value can be tuned so as to maximize the elimination of false alarms while minimizing the probability of misdetection.

This sort of distance threshold setting is based on the fact that, for each ECC code rate and effective SNR, the distance between a received symbol and the corresponding ideal constellation point is bounded and can be used for identifying and eliminating false alarms, in an embodiment. (The regenerated symbols are regarded as estimates of the constellation points, since they are taken from the output of the Viterbi decoder and therefore, in many practical scenarios, have a lower error probability than the received symbols.)

For example, when the RE sequence in question has a high effective SNR and a strong ECC (small code rate), it is expected that, the received symbols will be fairly close to the regenerated symbols. In such a case, module 80 would typically set a small distance threshold. When the effective SNR is low and/or the ECC is weak, module 80 would typically set a large distance threshold.

The above-described threshold adaptation technique is highly robust and performs well over a wide range of SNR. In an embodiment, processing circuitry 32 estimates the effective SNR by applying an Exponential Effective Signal-to-interference Ratio Flapping (EESM) computation to known Common Reference Signals (CRS) or other pilot signals that are embedded in the received signal.

In some embodiments, a power estimation module 84 estimates the power of the equalized PDCCH symbols. The estimated power (denoted PowerBoost in the figure) is used for adjusting the effective SNR in module 80, which is based on the CRS. This adjustment estimates the effective SNR of the PDCCH signal In alternative embodiments, module 80 may calculate Thr based on any suitable subset of the above-described parameters, and/or based on any other suitable parameter.

The UE configuration shown in FIG. 1 is an example configuration, which is depicted solely for the sake of clarity. In alternative embodiments, any other suitable UE configuration can also be used. Some UE elements that are not, mandatory for understanding of the disclosed techniques have been omitted from the figures for the sake of clarity. The different UE elements are typically implemented using dedicated hardware, such as using one or more Application-Specific Integrated Circuits (ASICs), Radio frequency Integrated Circuits (RFIC) and/or Field-Programmable Gate Arrays (FPGAs). Alternatively, some UE elements may be implemented using software executing on programmable hardware, or using a combination of hardware and software elements.

In some embodiments, some elements of UE 20 may be fabricated in a chip-set. When implementing the disclosed techniques in software on a programmable processor, the software may be downloaded to the processor in electronic form, over a network, for example, or it may, alternatively or additionally, be provided and/or stored on non-transitory tangible media, such as magnetic, optical or electronic memory.

Figure 2:
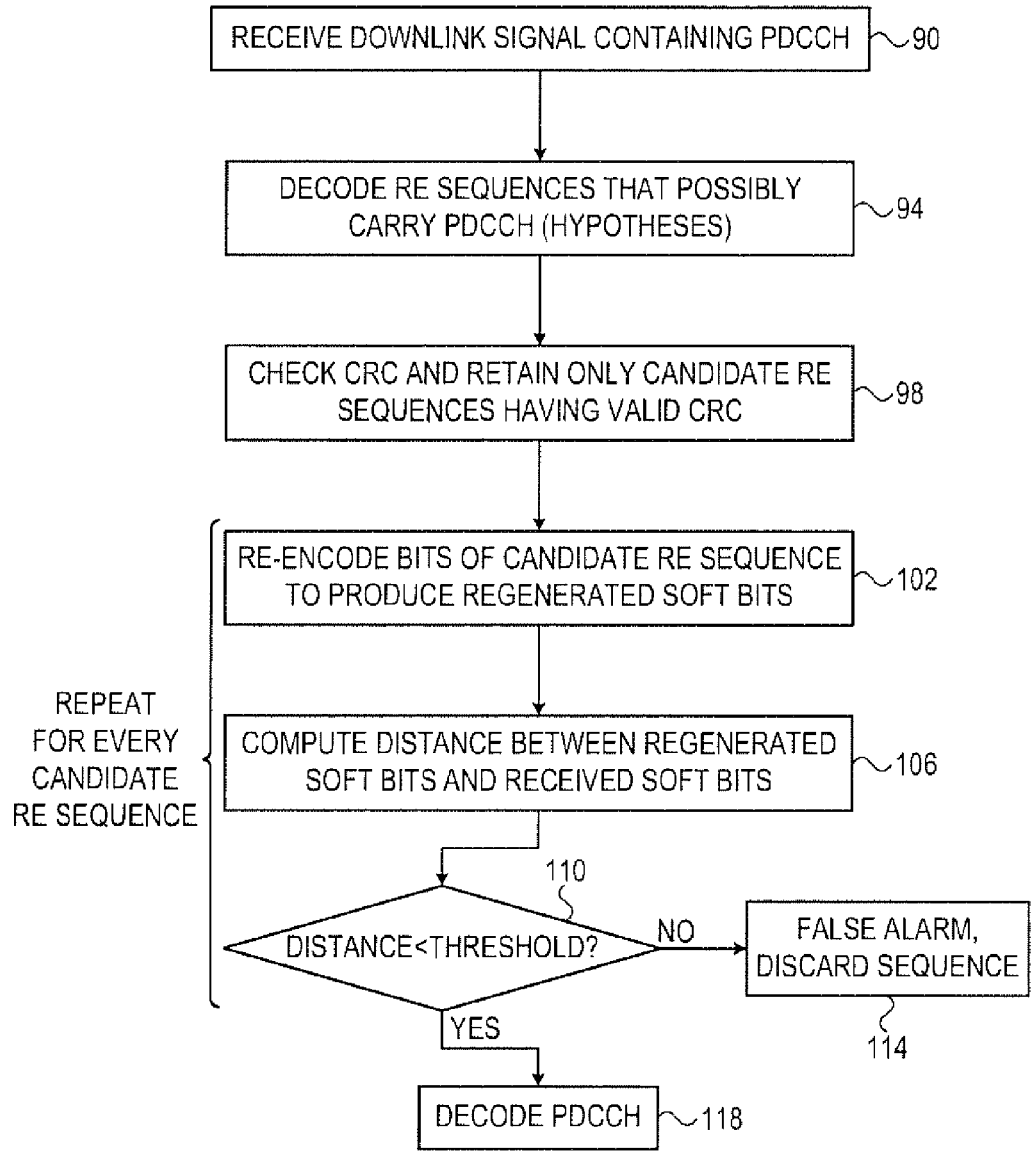
FIG. 2 is a flow chart that schematically illustrates a method for mitigating false PDCCH detections, in accordance with an embodiment that is described herein.

FIG. 2 is a flow chart that schematically illustrates a method for mitigating false PDCCH detections, in accordance with an embodiment that is described herein. The method begins with receiver 26 of UE 20 receiving a downlink signal from an eNodeB, at a reception operation 90.

Processing circuitry 32 of UE 20 decodes a set of RE sequences (hypotheses) that potentially carry a PDCCH (e.g., in accordance with the hypotheses specified in the LTE specifications), at a sequence decoding operation 94. CRC checking module 58 verifies the CRC for each decoded sequence, at a CRC checking operation 98. Processing circuitry 32 retains only the (one or more) RE sequences having a valid CRC, and discards the other sequences. The RE sequences having valid CRC are regarded as candidate sequences, and provided to PDCCH false alarm mitigation unit 60 for verification.

For each candidate sequence, re-encoding module 61 in unit 60 re-encodes the decoded bits produced by Viterbi decoder 52, at a re-encoding operation 102, so as to produce a stream of regenerated symbols. Distance metric calculation module 72 calculates the distance between the regenerated symbols and the respective received symbols (after pre-processing by module 68), at a distance computation operation 106.

At a threshold comparison operation 110, threshold comparison module 76 compares the distance to the threshold Thr. If the distance is above the threshold, unit 60 indicates a false detection, at a false alarm indication operation 114. If the distance is below the threshold, unit 60 indicates that the RE sequence is indeed the assigned sequence that carries the PDCCH. Circuitry 32 then decodes the PDCCH from the assigned RE sequence, at a PDCCH decoding operation 118. Operations 102-114 are repeated for each candidate RE sequence.

Although the embodiments described herein mainly address PDCCH decoding, the methods and systems described herein can also be used in other applications, such as in decoding Enhanced PDCCH (E-PDCCH) channels specified in release 11 and above of the LTE specifications.

In the embodiments described herein, the PDCCH candidates are received ever a single carrier. In alternative embodiments, such as in Carrier Aggregation (CA) systems, processing circuitry 32 decodes the PDCCH candidates from a signal that comprises multiple carriers.

Although the embodiments described herein refer mainly to communication terminals, the disclosed techniques can be used in other types of communication equipment such as, for example, in base station receivers.

It is noted that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method, comprising:

receiving in a communication terminal a signal, which is transmitted in multiple links and which comprises a control channel transmitted in an assigned sequence of the links;

identifying one or more candidate sequences of the links that are likely to be the assigned sequence;

for at least one candidate sequence, verifying whether the candidate sequence is the assigned sequence, by re-encoding decoded bits of the candidate sequence to produce regenerated symbols, and checking whether a distance metric between the regenerated symbols and respective received symbols from which the decoded bits were decoded is below a distance threshold that is set adaptively based on a property of the received symbols of the candidate sequence; and extracting the control channel from the candidate sequence in response to verifying that the candidate sequence is the assigned sequence.

2. The method according to claim 1, wherein identifying the candidate sequences comprises testing a predefined set of sequences for a valid Cyclic Redundancy Check (CRC), and wherein verifying whether the candidate sequence is the assigned sequence comprises verifying whether the CRC of the candidate sequence was falsely found to be valid.

3. The method according to claim 1, comprising setting the distance threshold based on a power level of the received symbols of the candidate sequence.

4. The method according to claim 1, comprising estimating an effective Signal-to-Noise Ratio (SNR) in the links of the candidate sequence, and setting the distance threshold based on the effective SNR.

5. The method according to claim 4, wherein estimating the effective SNR comprises applying an Exponential Effective Signal-to-Interference Ratio Mapping (EESM) computation to known reference signals that are comprised in the received signal.

6. The method according to claim 1, comprising setting the distance threshold based on a code rate used in the control channel.

7. The method according to claim 1, wherein identifying the candidate sequences comprises selecting one or more sequences of the links for which a likelihood of being the assigned sequence is higher than a likelihood threshold.

8. The method according to claim 1, wherein receiving the signal comprises receiving a carrier-aggregation signal that comprises two or more carriers, and wherein identifying the candidate sequences comprises decoding the candidate sequences from at least two of the carriers.

9. The method according to claim 1, wherein the links comprise time-frequency Resource Elements (REs).

10. Apparatus, comprising:

a receiver configured to receive a signal, which is transmitted in multiple links and which comprises a control channel transmitted in an assigned sequence of the links; and processing circuitry, which is configured to identify one or more candidate sequences of the links that are likely to be the assigned sequence, to verify, for at least one candidate sequence, whether the candidate sequence is the assigned sequence, by re-encoding decoded bits of the candidate sequence to produce regenerated symbols, and checking whether a distance metric between the regenerated symbols and respective received symbols from which the decoded bits were decoded is below a distance threshold that is set adaptively based on a property of the received symbols of the candidate sequence, and to extract the control channel from the candidate sequence in response to verifying that the candidate sequence is the assigned sequence.

11. The apparatus according to claim 10, wherein the processing circuitry is configured to test a predefined set of sequences for a valid Cyclic Redundancy Check (CRC), and to verify whether the candidate sequence is the assigned sequence by verifying whether the CRC of the candidate sequence was falsely found to be valid.

12. A mobile communication terminal comprising the apparatus of claim 10.

13. A chipset for processing signals in a mobile communication terminal, comprising the apparatus of claim 10.

14. A method, comprising:
   receiving in a mobile communication terminal a signal, which is transmitted in multiple links and which comprises a control channel transmitted in an assigned sequence of the links;
   for a selected sequence of the links, re-encoding decoded bits of the selected sequence to produce regenerated symbols;
   comparing the regenerated symbols to respective received symbols from which the decoded bits were decoded and applying a distance metric to determine a distance between the regenerated symbols and the respective received symbols; and
   verifying that the selected sequence of links contains the control channel by checking that the distance is below a distance threshold that is set adaptively based on a property of the received symbols of the selected sequence.

15. The method according to claim 14, comprising selecting the sequence of the links by verifying that the selected sequence has a valid Cyclic Redundancy Check (CRC).

16. The method according to claim 14, comprising decoding the control channel from the selected sequence in response to verifying that the selected sequence is the assigned sequence.

17. The method according to claim 14, comprising setting the distance threshold based on at least one parameter selected from a group of parameters comprising a power level of the received symbols of the selected sequence, an effective Signal-to-Noise Ratio (SNR) in the REs of the selected sequence, and a code rate used in the control channel.

* * * * *